April 25, 1967 W. F. GALEY ETAL 3,316,391

READ-OUT APPARATUS FOR INTERROGATING PERFORATED TAPE

Original Filed Nov. 2, 1959 8 Sheets-Sheet 1

INVENTORS
William F. Galey
George W. Misson
Wolfe, Hubbard, Voit + Osann
ATTORNEYS

READ-OUT APPARATUS FOR INTERROGATING PERFORATED TAPE

Original Filed Nov. 2, 1959 8 Sheets-Sheet 2

INVENTORS
William F. Galey
George W. Misson
Wolfe, Hubbard, Voit + Osann
ATTORNEYS April 25, 1967 W. F. GALEY ETAL 3,316,391

READ-OUT APPARATUS FOR INTERROGATING PERFORATED TAPE

Original Filed Nov. 2, 1959 8 Sheets-Sheet 3

INVENTORS
William F. Galey
George W. Misson
Wolfe, Hubbard, Voit & Osann
ATTORNEYS

READ-OUT APPARATUS FOR INTERROGATING PERFORATED TAPE

Original Filed Nov. 2, 1959 8 Sheets-Sheet 4

INVENTORS
William F. Galey
George W. Misson
Wolfe, Hubbard, Voit + Osann
ATTORNEYS April 25, 1967 W. F. GALEY ETAL 3,316,391

READ-OUT APPARATUS FOR INTERROGATING PERFORATED TAPE

Original Filed Nov. 2, 1959 8 Sheets-Sheet 5

INVENTORS
William F. Galey
George W. Misson
Wolfe, Hubbard, Voit + Osann
ATTORNEYS

READ-OUT APPARATUS FOR INTERROGATING PERFORATED TAPE

INVENTORS
William F. Galey
George W. Misson
Wolfe, Hubbard, Voit + Osann
ATTORNEYS

READ-OUT APPARATUS FOR INTERROGATING PERFORATED TAPE

Original Filed Nov. 2, 1959 8 Sheets-Sheet 7

Inventors
William F. Galey
George W. Misson
Wolfe, Hubbard, Voit + Osann
Attorneys

READ-OUT APPARATUS FOR INTERROGATING PERFORATED TAPE

Original Filed Nov. 2, 1959 8 Sheets-Sheet 8

INVENTORS
William F. Galey
George W. Misson
Wolfe, Hubbard, Voit & Osann
ATTORNEYS United States Patent Office 3,316,391
Patented Apr. 25, 1967

3,316,391
READ-OUT APPARATUS FOR INTERROGATING PERFORATED TAPE

William F. Galey, Saxonburg, and George W. Misson, Pittsburgh, Pa., assignors to Pittsburgh Plate Glass Company, Pittsburgh, Pa., a corporation of Pennsylvania Original application Nov. 2, 1959, Ser. No. 850,460. Divided and this application May 6, 1965, Ser. No. 468,662
4 Claims. (Cl. 235—61.11)

This application is a division of our copending application Ser. No. 850,460, filed Nov. 2, 1959, which passed to issue June 29, 1965 as U.S. Patent No. 3,191,857.

This invention relates in general to the manufacture of plate glass and particularly to a process for inspecting sheets or a ribbon of polished and ground plate glass for defects, and directing the cutting of the glass into smaller, saleable sizes according to the defects which are found to be present.

In the manufacture of plate glass heretofore, the manner of cutting a large sheet or continuous ribbon of plate glass into smaller desired size has been determined by trained personnel after visual inspection of the glass for the presence of defects which are likely to affect its optical and mechanical properties. The defects which may be present in the body of or on the surface of polished plate glass sheets or ribbon and which mar the optical properties of the glass sufficiently to be discerned by the human eye, are of certain well-known and picturesque named kinds. Examples of these are: point type defects such as stones or sand holes, gross surface defects such as sleeks and scratches, and microscopic surface defects such as sweep and peel.

It has been found that as various grades of plate glass are required for various purposes, certain defects, if not too severe, may be permitted in the smaller sizes that are cut from the larger uncut sheets or ribbon. While glass which is to be used for high quality mirrors is required to meet quality standards far higher than required for glazing quality plate glass, certain minor defects may yet be permitted in plate glass graded for mirror use. More severe defects (mirror defects), while lowering the quality of the glass mirror grade, however, are acceptable in plate glass graded "glazing." Glass containing defects of a greater severity, such that would lower the quality so that it would be judged below glazing grade, is called "cullet." Such defects are called "glazing" or "total" defects. To produce usable sizes of glass of mirror or glazing grade, therefore, the defect containing areas of the glass must be excluded by the cutting procedure followed in partitioning the sheets or ribbon. And, it is clearly apparent that in order to obtain the greatest yield of usable glass in the desired smaller sizes from the large uncut sheet or ribbon, both the severity of the defects as well as the area that they cover, will enter into the determination of the manner in which the glass should be partitioned and cut.

In fitting or piecing out different combinations of various sizes from the usable areas of the large uncut plate glass sheets or ribbons, it is desired, of course, to throw away or downgrade as little of the glass as is necessary. Time and timing are always of concern since the operation must maintain pace with high production manufacture in which glass in a given width, either as large separate sheets or as unbroken ribbon, moves at a continuous rate as it is formed and finished.

Efficiency goals in laying out the usable areas of the total glass output into smaller sizes have in fact been limited by the number of factors which skilled layout men have found it practical to consider. The possible factors are many. For example, a large number of predetermined sizes are marketable and more than one grade may also be involved. Inspection is required for the total output since the defect distribution is not predictable. Relative preference or demand for the various sizes may also be factors. The demand for particular sizes may change in accordance with the quantities which have already been cut. Obviously, the number of choices of possible glass sizes which must be evaluated before a cut is made is very large if all of the factors or choices are considered.

In the interests of reducing storage and handling of the glass produced before shipping, close control of elapsed time is also involved. Desirably the sequence of inspection for defects, the presentation of all the relevant data, the making of economic cutting decisions by the layout men, the actual cutting, and the routing of the cut glass sizes to respective packing stations, is an essentially on-line procedure.

It is the general object of this invention to provide a process for directing the cutting of plate glass in pace with its production which ultilizes manual, visual inspection similar to that which has been carried out heretofore, but eliminates human calculation in correlating supplied data on specific defect locations in a sheet or ribbon to be cut on the one hand, and on desired sizes on the other hand, to reach a cutting determination aimed at granting the most effective overall yield of glass. While any manual, visual inspection procedure necessarily requires human judgment in evaluating the severity of the defects, by reducing the number of decisions requiring subjective evaluation, the object is to obtain greater uniformity in glass grading with less waste than has been achievable heretofore with known inspection, partitioning, and cutting procedures.

Another object is to provide a process and apparatus for partitioning sheets or a ribbon of glass into desired smaller sizes wherein both the severity of the defects as well as their distribution are considered in determining the manner in which the glass should be cut.

Another object is to provide in pace with the glass production a secondary record of the defects in the glass which comprises an analogue of the defect spotted glass sheet or ribbon and a means for storing defect location information.

A further object is to provide a defect storage apparatus wherein a secondary record of defect locations is made by punching holes in a paper tape at locations coordinately corresponding to the locations of the defects in the glass.

Still another object is to provide for read-out of the defect location information found on the secondary record, so that a cutting determination may be made by computations based on the data read-out to partition the sheet or ribbon into smaller programmed sizes.

More specifically, it is an object to provide means for read-out of defect location information on the secondary record for progressively greater (or smaller) lengths of glass starting with a point on the secondary record corresponding to the leading edge of the sheet or ribbon of glass, so that based on the read-out data, programmed widths may be fitted into the usable lengths of the glass and the cut for which the best fit is provided may be chosen.

Other objects will become apparent as the following description proceeds taken together with the accompanying drawings, wherein.

Figure 8A:
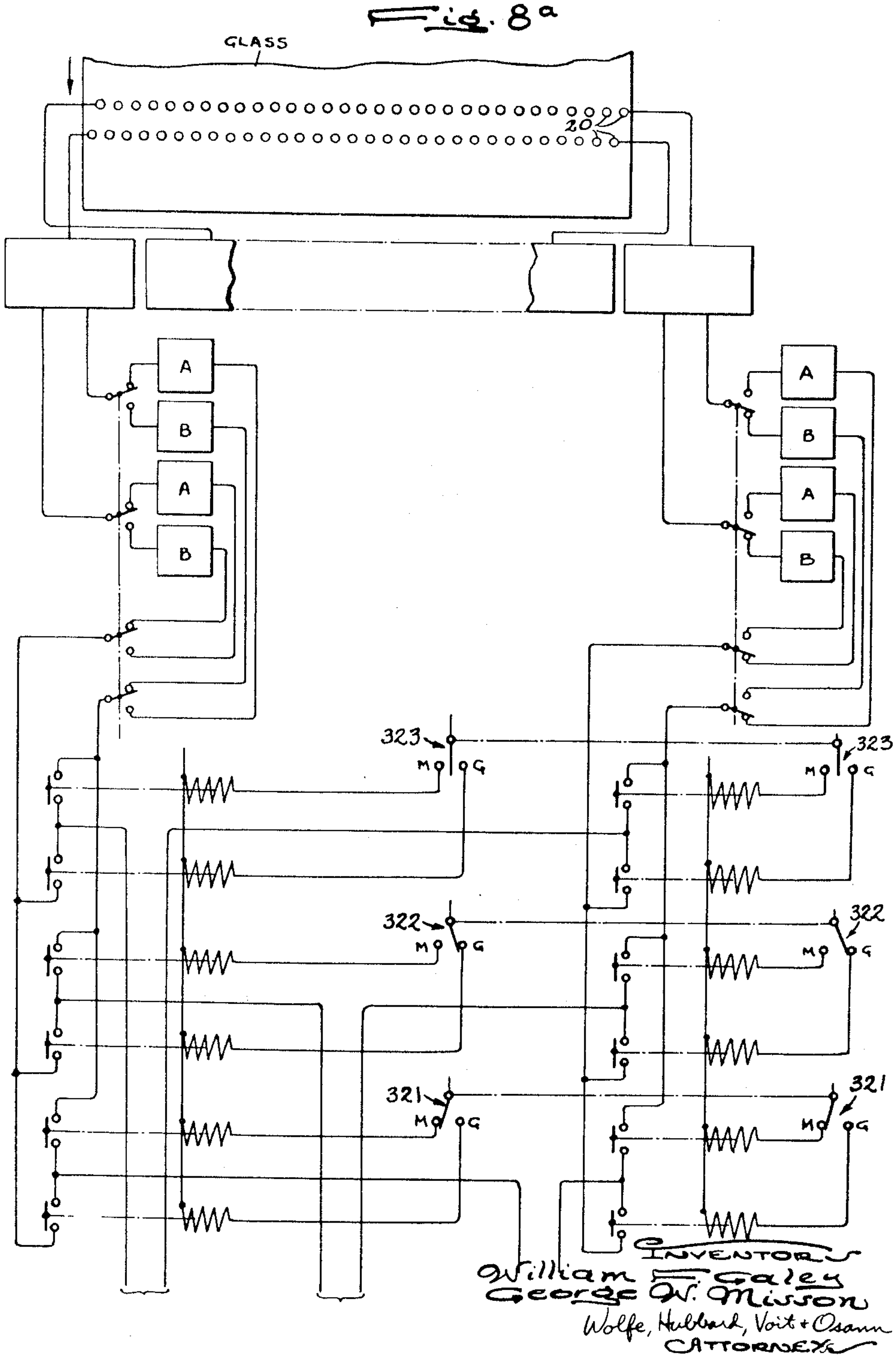
Figure 8B:
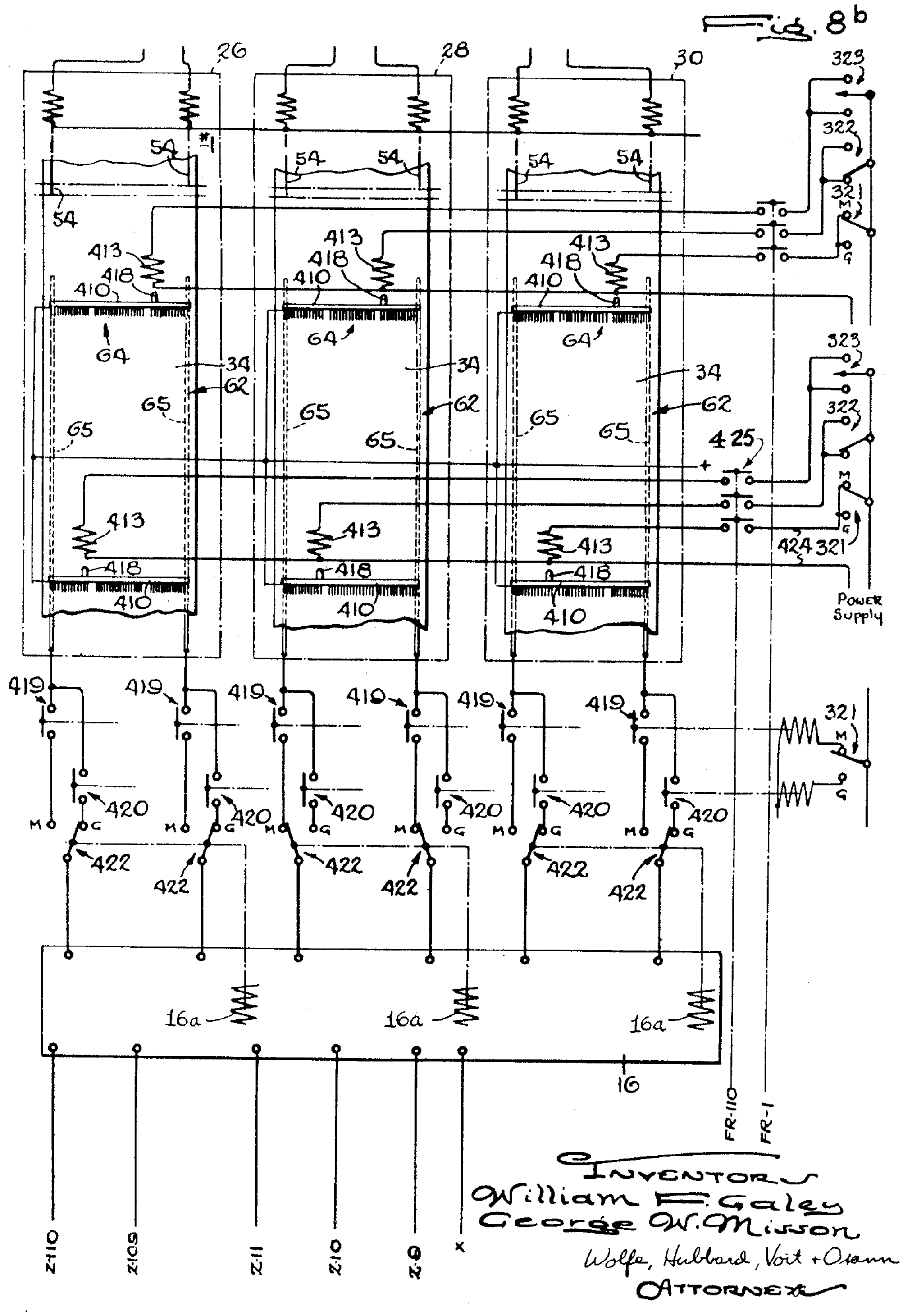
Figure 8C:
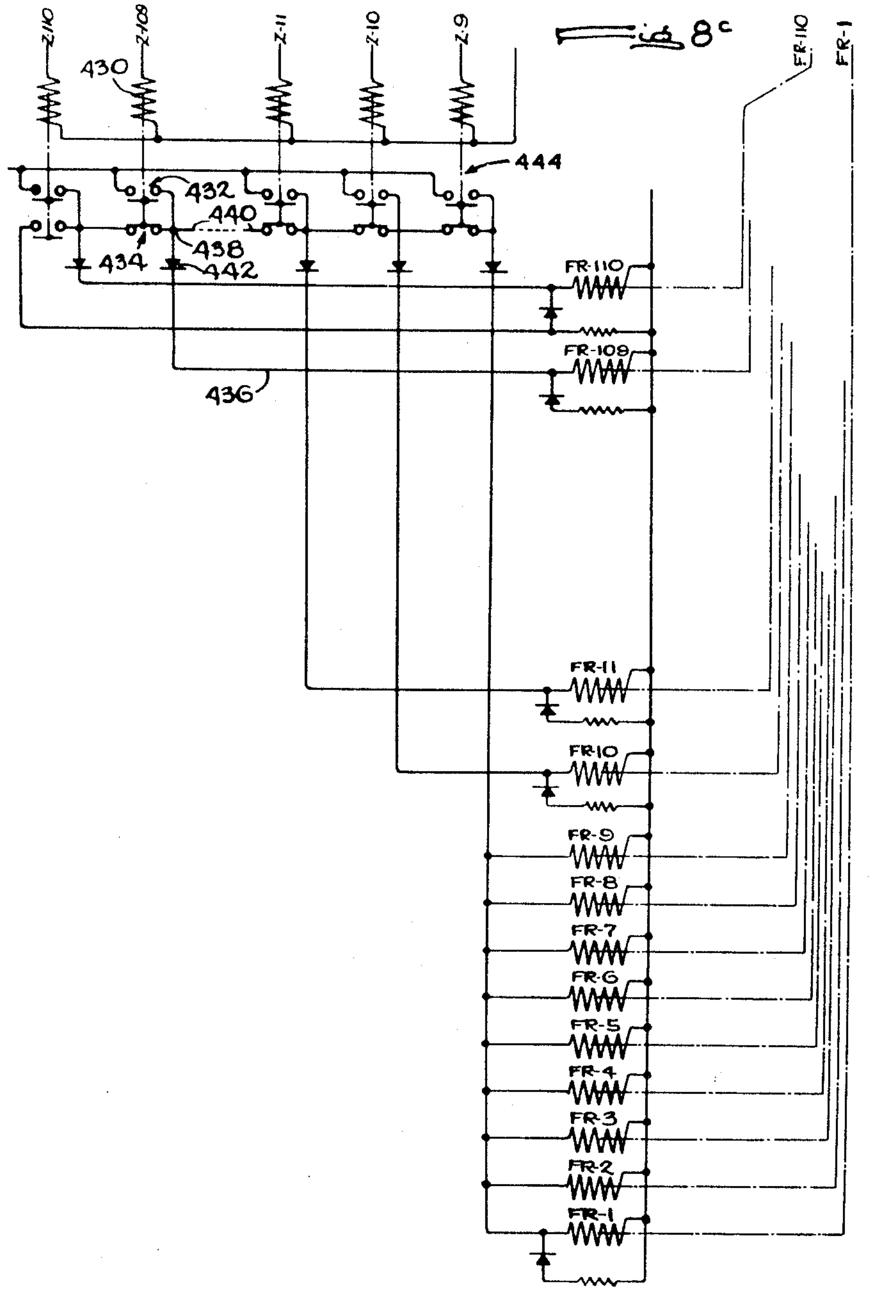

FIGS. 8*a*, 8*b*, and 8*c*, when joined along the indicated junction lines, together diagrammatically illustrate the system for supplying defect information to, and operating the defect storage apparatus.

While the invention is susceptible of various modifications and alternative constructions, an illustrative form of the invention has been shown in the drawings and will be described in considerable detail. It should be understood, however, that there is no intention to limit the invention to the form disclosed, on the contrary, the invention is to cover all modifications, alternative constructions and equivalents falling within the spirit and scope of the invention as expressed in the appended claims.

In order to provide the requisite information as to defects appearing in the glass, which information is used in determining the manner of partitioning the glass, the glass is first manually inspected for the presence of defects, and those of such severity as to affect its quality are dimensionally located, by colored crayon marks placed on the surface of the sheet or ribbon. A transverse cut across the glass sheet or ribbon width is herein called a Z cut, and a set of second cuts are herein called S cuts, to slit or slice the cut off Z piece into small widths. The Z and S cuts are made according to cutting determinations evolved by computation to partition the glass into smaller defect-free rectangular pieces excluding the defect containing areas. While the expression "defect-free" is used herein, it is recognized that no portion for the glass is fully defect-free, and by this expression is meant free from defects of such severity as would lower the quality of those areas of the glass as might contain them to below a certain specified (glazing or mirror) grade. Necessarily, therefore, "defect-free" also requires the standard being applied, that is free from "mirrow" or "glazing" defects.

In the present industrial apparatus, computations are made automatically by a computer 16 supplied with defect location information. A computer having means particularly suited to making the requisite computations is shown in the copending application, Ser. No. 850,360, filed Nov. 2, 1959, now Patent No. 3,246,550 by William F. Galey, Joseph A. Gulotta and Forrest K. Unbel, entitled Length and Area Partitioning Methods and Apparatus. The computer 16 is supplied with defect location information, and at a speed such that the glass may be cut according to the cutting determinations made by the computer in pace with its continuous production and movement along the conveyor to the glass cutting apparatus. The cutting determinations are made following a logic involving fitting or piecing out different combinations of various programmed sizes from the usable, defect-free areas of the large glass sheets or ribbon. The computer may be installed at any convenient location near to or remote from the production line and is supplied with defect information, and transmits commands to the glass cutting apparatus through suitable electrical connections.

In order to make the computations by means of which the cutting determinations are evolved, the computer is supplied upon its command with information as to the defects in the glass. Mounted over the conveyor on a bridge located spaced from the glass cutting apparatus is a photosensitive defect detection apparatus employing photosensitive elements 29 which examines the glass for the presence of defect-marks as it moves along the conveyor past the bridge and provides dimensional information as to the location of the defects. This information is supplied to a defect storage apparatus which may be located either at the computer installation, or elsewhere, and is provided to produce a secondary record to store the defect location information so that it is available to the computer when required. This secondary record of the defects location is made in pace with the movement of the glass along the conveyor and, in the present case, comprises a paper tape prepared as an analogue of the defect bearing glass sheets or ribbons. This secondary record provides the defect location information in a form that is readily usable, namely, in the form of a hole punched in the tape at a dimensional location which corresponds to the dimensional location of the defect with respect to the leading edge and the side edge of the glass sheet or ribbon.

The present invention relates to the read-out apparatus by which the paper tape containing holes corresponding to the dimensional location of the glass defects is interrogated. The information thereby obtained is transferred to the computer, whereby trial fits and cutting decisions may be made.

Figure 1:
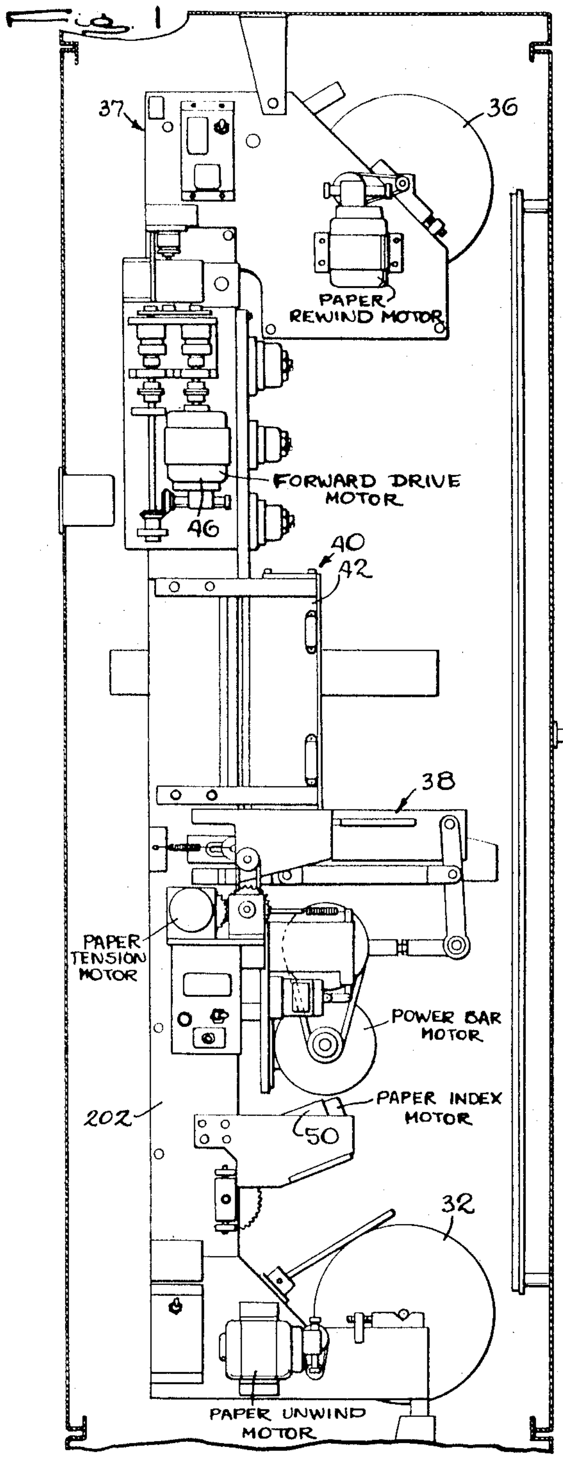
FIGURE 1 is a side elevational view of the defect storage apparatus employing the read-out apparatus of the present invention.
Figure 2:
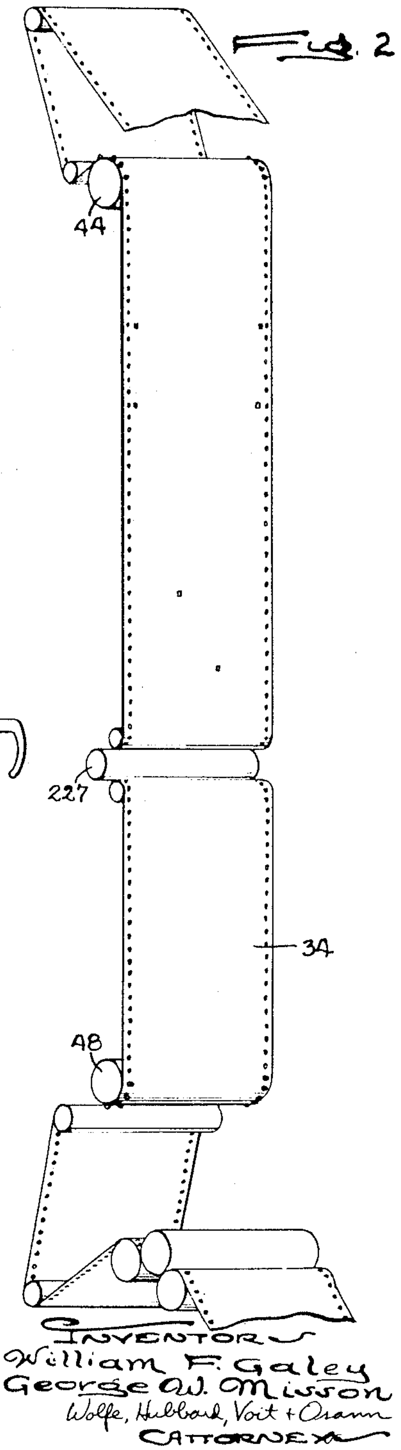
FIG. 2 is a perspective view illustrating the movement of the paper tape through the defect storage apparatus.
Figure 3:
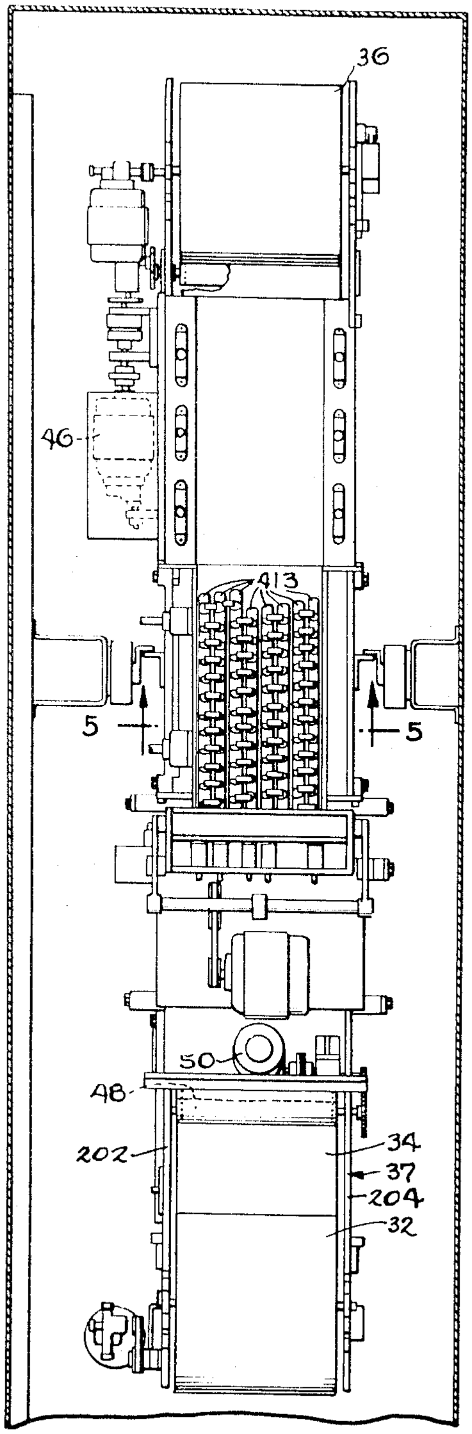
FIG. 3 is a front elevational view of the defect storage apparatus.
Figure 4:
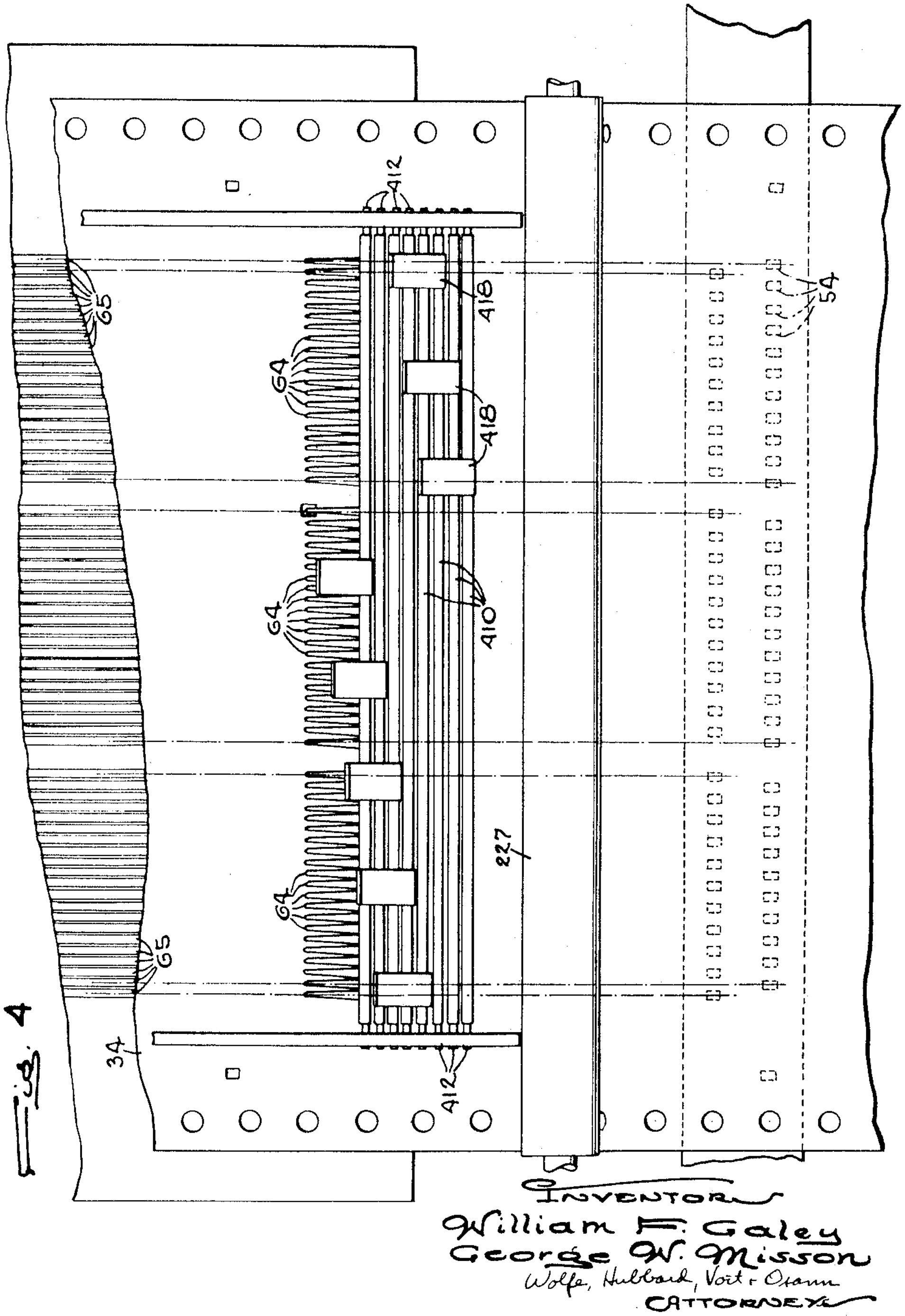
FIG. 4 is a fragmentary face view with parts broken away illustrating the read-out apparatus and a portion of the tape.
Figure 7:
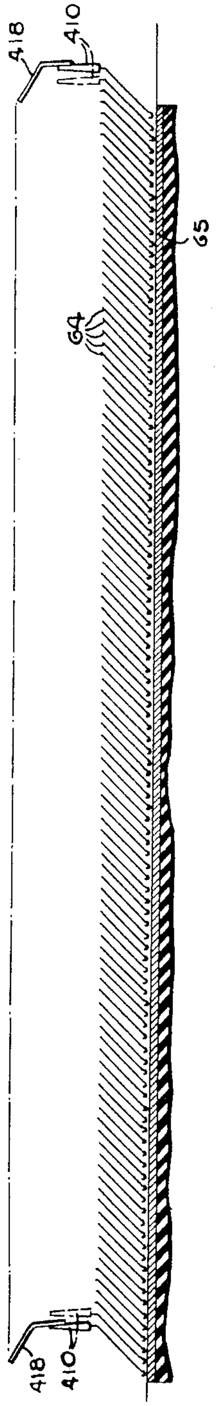
FIG. 7 is a diagrammatic view of the read-out head.

Each defect storage unit includes, as illustrated more particularly in FIGS. 1–3, separate punch and read-out sections. The storage units are mounted vertically in a cabinet, and each comprises a vertical frame having means at the lower end for support of a supply roll 32 of paper tape, which unwinds to supply the tape 34 which is fed upwardly to a rewind roll 36 at the top of the unit frame 37. The path of the paper is illustrated in FIG. 2 and proceeds from the supply roll upwardly through the punch section 38 and the read-out section 40, at a rate determined by the speed of movement of the glass on the conveyor.

The paper is drawn through the read-out head 42 of the read-out section by a paper drive which comprises sprockets 44 engageable in holes in the edges of the paper tape driven by a forward motor 46 by means of a transmission mounted on the frame. The transmission is controlled from the computer 16 so that a defect information containing portion of the paper tape is moved into the read-out head and stopped for read-out purposes and then advanced following the read-out operation.

The paper tape is released from the supply roll 32 by a paper indexing means which includes sprockets 48 engageable in the holes of the paper tape driven by a drive motor 50 coupled to a one-revolution clutch which connects the motor to the sprocket 48 to operate it intermittently and thereby feed the paper at a timed rate into the punch section 38 of the apparatus. The motor 50, clutch, and sprocket 48 are all suitably mounted on the frame adjacent the supply roll 32. This one-revolution clutch is adapted for operation in accordance with the speed of the glass on the conveyor, so that movement of the paper tape through the punch section, while intermittent, is at the average speed to scale of the movement of the glass.

Figure 6:
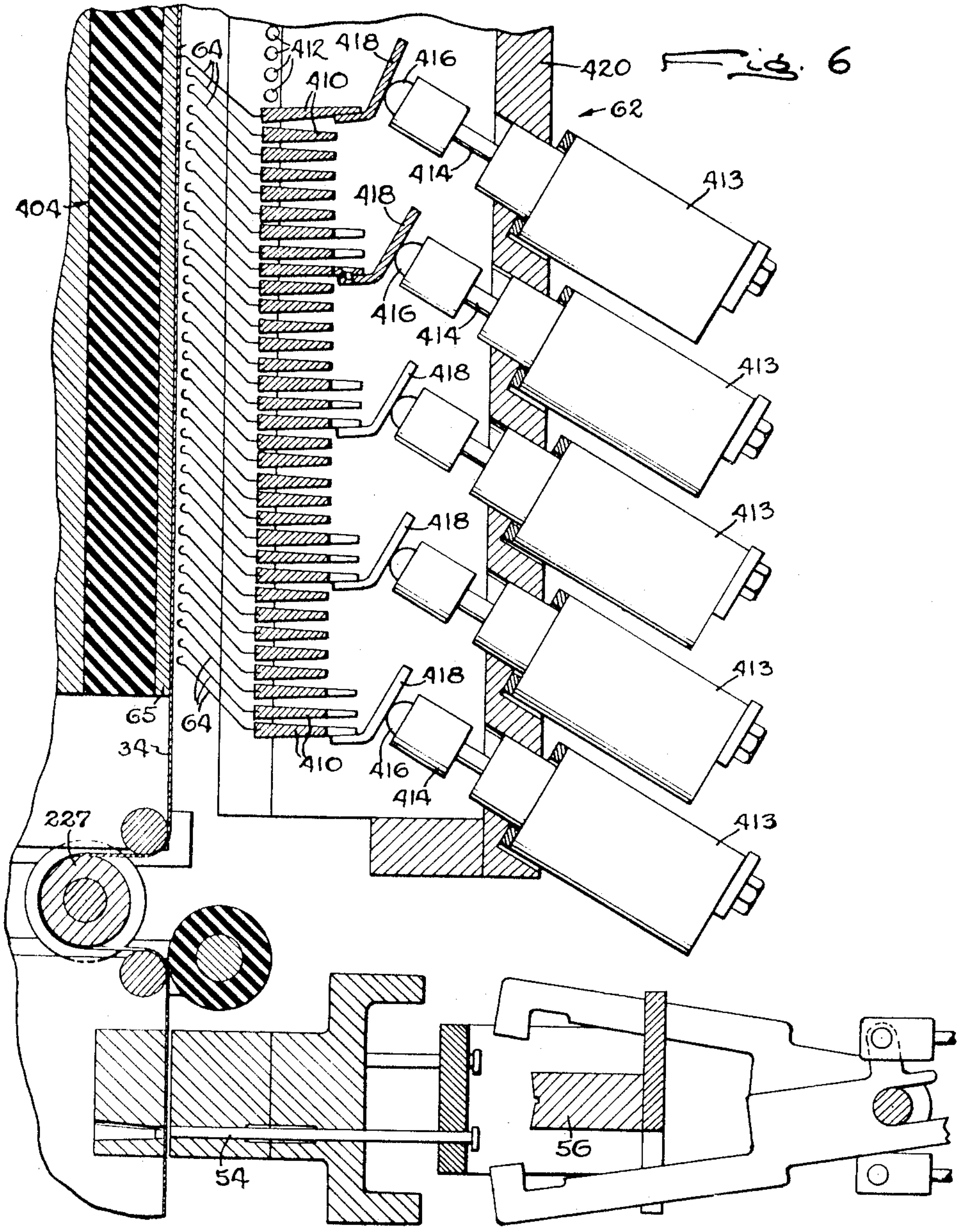
FIG. 6 is a sectional view taken substantially in the plane of line 6—6 of FIG. 5.

The punch holes are formed in the paper tape 34 by a punch mechanism in the punch section which includes two rows of punches 54 (FIG. 6) each punch being selectively operable to be driven through the tape 34 by means of a motor driven, intermittently operated, power bar 56. A one-revolution clutch connected to operate the power bar 56 is controlled so as to be synchronized with the paper movement and operates the punches during the period the paper is stopped in its intermittent feed through the punch section.

According to the present invention, the read-out section 40 includes a read-out head 62 (FIG. 6) which has electrically energized fingers 64 that may be pivoted into contact with the paper tape when the latter is stopped in the section. Bus bars 65 in the base plate under the paper tape which extend in the direction of paper movement, are contacted by and thus energized by a finger extending through any defect hole to indicate the S location of that defect hole. Selected Z lengths of the tape stopped in the read-out head 62 may be read-out by pivoting banks of the fingers 64 into tape contact upon command of the computer, for supplying defect information as to the corresponding Z lengths of the glass sheet or ribbon of which the selected length of tape comprises a record. This S location of any defect hole in the portion of a tape read-out is the defect information supplied to the computer 16 through suitable connections.

Turning now to the read-out section in more detail, it will be noted that the read-out sections of each defect storage unit 26, 28, 30, are the same and, accordingly, one will be described. As shown for example in FIGS. 1 and 6, the paper proceeds in each defect storage unit from the punch section in a loop around the take-up roll into the read-out head 62. The paper tape is stopped in the read-out head for read-out purposes by stopping the motion of the paper drive sprocket 44. Since the paper is fed at an intermittent but constant rate through the punch section, the extra paper between the sections for the period of read-out is held by means of the take-up roller 227. With the present defect storage apparatus connected to supply defect information to a computer 16 of the type shown in the copending application of William F. Galey, et al., Ser. No. 850,360, filed Nov. 2, 1959, the time allotted for the computer 16 to choose a trial Z from a set of programmed trial Z lengths is about five seconds. In this time period, for example, a total of twenty trial Z's may be considered by the computer. At the maximum permitted glass speed somewhat in excess of 200 linear inches a minute under these conditions, a total of 9 mosaics pass the bridge during this read-out period of five seconds. Similarly, a total of nine mosaics pass through the punch section during this read-out period, so that 9 times ⅛ inch tape unit square, or 1⅛ inches is the amount of additional paper tape required to be stored around the take-up roller 227 to avoid having excessive paper tape in the punch section during the read-out period.

The present read-out mechanism provides means for interrogating a full 110 mosaics length of paper tape containing defect data. This mechanism also provides means for interrogating the tape for any length Z up to and including the maximum of 110 starting with the 1st unit square or mosaic adjacent the leading edge of an uncut glass sheet. Moreover, by coordinating paper tape position any length Z on the tape record can be interrogated, starting not only with the leading edge but at any mosaic downstream on the tape from the leading edge. Referring, therefore, to FIGS. 4–7, the read-out head is made in two parts, a fixed frame 402 which carries banks of pick-up fingers 64 and is mounted between the side frame members 202, 204 of the storage unit, and a pick-up unit 404 hinged to the read-out head frame 402. With this arrangement, the pick-up unit 404 may be swung away from the frame 402 so that the paper tape may be readily threaded through the section. The pick-up unit 404 is locked against the frame by means of a pivotable locking lever 406 the end of which fits into a cam slot 408 in the frame.

Figure 5:
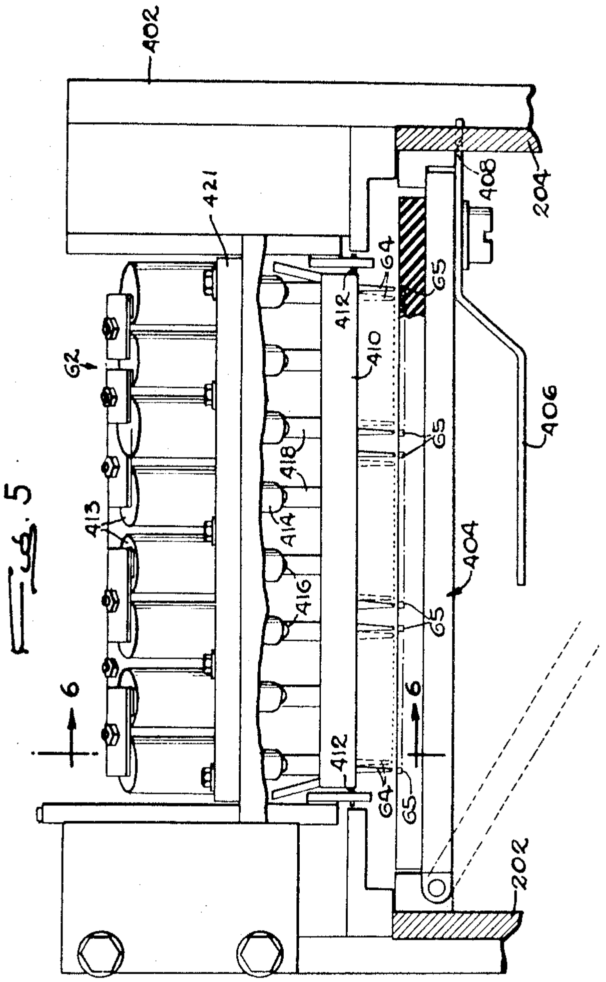
FIG. 5 is a sectional view taken substantially in the plane of lines 5—5 of FIG. 3.

The read-out head frame 402 supports 110 transverse bars 410 which are pivotally mounted by means of pointed set screws 412 at each end. Each bar 410 has a total of at least 62 depending wire fingers 64, the fingers of each bar being aligned with the fingers of every other bar. The bars are pivotable from a retracted position (FIG. 6) wherein the ends of the fingers are spaced from the pick-up unit to an advanced position where the fingers contact the paper tape, and, where defect holes appear in the tape—the pick-up unit 404. For pivoting the bars 410 and fingers 64, each bar 410 is operated by a solenoid actuator 413 having a normally retracted plunger 414 with a tip 416 of nylon or other suitable insulating material contacting a lug 418 fixed to the bar. As shown in FIG. 5, the solenoids 413, which constitute actuators for the bars 410, are lined up on a cross-plate 421 in sets of eight across the unit, each solenoid being positioned slightly in advance of the one preceding so as to be adjacent the corresponding bar 410. When the solenoids 413 are energized, the bars 410 are pivoted forwardly to the position shown for the upper bar 410 in FIG. 6, to advance the fingers 64 toward the pick-up unit 404.

This pick-up unit 404 consists of a base plate 416 having longitudinal parallel bus bars 65 embedded in its surface, one bus bar 65 under each set of longitudinally aligned fingers carried by the pivotable transverse bars 410, and, therefore, for each mosaic across the tape that is, a total of at least sixty-two bus bars. As shown in FIG. 8*b*, means are provided for electrically connecting each bus bar individually to the computer 16 so that the requisite defect information, i.e., the S locations of unit square containing defect holes, may be supplied to the computer when required. This means includes relay operated contacts 419, 420 which are set by means of the selector switch 321–323 so that the individual bas bars 65 are connected to M (mirror) or G (glazing) output terminals according to whether the record in the associated defect storage unit contains mirror or glazing defects information.

In order for the computer 16 to make the partitioning calculations, defect information is required in the form of the S locations of defects in any given length Z. Since the tape of each defect storage unit contains defect information of a given quality grade, the computer 16 may obtain defect information according to quality grade by selecting the appropriate defect storage unit. While the read-out procedure may vary depending on the particular computer utilized, with a computer constructed in the manner described in detail in the copending application of William F. Galey, et al., Ser. No. 850,360, filed Nov. 2, 1959 and hereinbefore referred to, during an allotted read-out period of about five seconds a full set of programmed trial Z lengths are considered and one trial Z length chosen. Making partitioning calculations for the full length of an uncut glass sheet entails making successive cutting determinations until the entire sheet is partitioned. Starting with the uncut glass sheet the programmed trial Z lengths are considered relative to the actual leading edge and the best fits of the programmed widths chosen. After choosing a trial Z the programmed trial Z lengths are reconsidered from the new leading edge. To this end by means of the paper tape controls the paper tapes are advanced in the read-out heads to place the 1st mosaic following the new leading edge under the 1st row of read-out fingers 64 in the head.

Therefore, in the operation of the entire system where uncut glass sheets are present on the conveyor, the marks identifying the defects of an uncut glass sheet are detected by the photosensitive detection apparatus over the conveyor, and tape records prepared in the defect storage apparatus according to the defect information received from the photosensitive detection apparatus. The computing cycle begins as the tapes 34, which are operated in unison, are stopped by the paper tape control in the read-out heads with the defect information for the full sheet in the heads. As shown in U.S. Patent No. 3,191,857, previously mentioned, the paper control is directed by the leading edge finger assembly of each defect storage unit, the operation of the units being coordinated by parallel connections between the leading edge finger assemblies. Completing the circuit through the leading edge finger and bus bar, when a leading edge hole appears in each tape, is effective to start the computing cycle and, therefore, coordinates the operation of the computer 16 and the defect storage apparatus.

To consider the programmed trial Z lengths, the computer receives defect information by means of connections (FIG. 8*b*) leading downward from the bus bars 65 of the pick-up unit the computer 16. These connections are made to the M or G output terminals by selectively operating the switches 422 by the computer relays **16*a* according to the trial Z quality grade. The read-out head 40 provides means to pivot each transverse bar 410 carrying a row of fingers 64** into contact with a paper tape record containing defect holes in mosaics scattered over the tape, so as to permit read-out of the S locations of the defects by means of certain bus bars 65 being energized by the fingers 64 extending through the defect holes into contact with the bars. To read-out defect information from the tape for a given Z length requires that the solenoids 413 be actuated through the connection 424 to the power supply so as to pivot all the bars 410 from row 1 up to and including the row corresponding to the trial Z toward the pick-up unit so as to move the fingers 64 carried thereby into tape contact.

Whil the present construction would permit programming trial Z's in the order of increasing or decreasing length Z's, for convenience of illustration the trial Z's are assumed to be programmed in the order of decreasing length Z's as indicated in the example of U.S. Patent No. 3,191,857, previously mentioned. The solenoid actuators 413 for pivoting the bars 40 toward the pick-up unit, and thus the fingers 64 into tape contact, are energized through a switching matrix shown in FIG. 8c. The arrangement is such that as the computing cycle progresses, for each successive trial Z programmed the computer 16 supplies a signal through one of the connections Z–1–Z–110 to the switching matrix, which is effective to control the read-out operation of all three defect storage units. Assuming that two of the three units are in operation to store defect data of mirror and glazing quality grade, respectively, the switching matrix operates the read-out sections of both units, by selectively closing the relay contacts 425, so that defect information is supplied to lhe M and G output terminals of the pick-up unit. The computer 16 by its relays 16a selects the defect information required according to the quality grade.

The coils FR–1 to FR–11 and FR–109, FR–110, constitute the coils of the solenoids 413 for actuating the fingers bars 410. In the cascade circuit depicted, the solenoid coils FR–12—FR–109, and connections to these coils have been left off the diagram for simplicity, but each of these are connected similarly to FR–10, 11, 109 and 110 so that their manner of operation will be apparent.

As shown in FIG. 8b, the computer is connected by the conductors Z–9—Z–110 to the switching matrix shown in FIG. 8c. An input signal from the computer through any one of the conductors Z–9—Z–110, which is effect is a command from the computer to interrogate the record for defect information, operates to advance the first finger bar through the finger bar having that Z number, into tape contact. In this manner, an input signal from the computer through any one line causes a bank of fingers to move into paper tape contact to interrogate the portion of the tape from the leading edge through the mosaic having a Z corresponding to the Z number of the conductor.

In FIG. 8c, taking conductor Z–109, for example, an input signal received from the computer through that line will energize the relay coil 430 which has 2 sets of contacts, 432, 434. The relay coil 430 when energized closes the first contacts 432 and opens the second set of its contacts 434, and remains energized only for the duration of the input signal. Closing the first set of contacts 432 will energize the solenoid coil FR–109 by means of a conductor 436 joined to a line connected to a power supply.

From the junction 438 adjacent the second set of contacts 434, of the energized cascade relay, which junction is connected through the first set 432 of contacts when the relay is operated to the power supply, a conductor 440 leads through the normally closed contacts of each of the relays of the lower numbered Z relays so as to connect the solenoid coil FR1–109 in parallel and thereby energize each coil. The diodes 442 prevent reverse flow and false reading. By opening the first set of contacts 432 associated with energized cascade relay, the circuit to the solenoid coils of the higher numbered Z's is disconnected. Since the minimum length Z that can be cut with the glass cutting apparatus of FIGURE 1 is 18 inches or 9 mosaics, there is no provision made for individual energization of the finger rows Z–1 to Z–9 without simultaneously also advancing the rows of fingers Z–1 to Z–8 into paper tape engagement. Therefore, the cascade switching circuit includes no individual relays for rows Z–1 to 8 and the first relay 444 is connected to a conductor labeled Z–9.

The solenoid coils FR–1—FR–110 when energized close the relay contacts 425 (FIG. 8b) which is effective to connect the power supply to the coils 413 for actuating the finger bars 410 of all operative read-out heads. In response thereto the entire bank of fingers in each read-out head from the first finger bar to the finger bar having the number corresponding to the trial Z length, are pivoted into tape contact for read-out of defect information for the trial Z. In the normal read-out procedure, the Z connection voltages are shifted successively from higher to lower numbered trial Z connections, causing the bank of fingers below the trial Z to remain in contact with the tape and the remainder to retract from the tape.

We claim as our invention:

1. In a read-out head for interrogating a perforation spotted paper record, the combination comprising, a bank of resilient fingers arranged in aligned ranks and rows and mounted to contact the paper record, means for actuating and energizing selected ranks of said fingers, a pick-up unit opposite said fingers, and means included in said pick-up unit for sensing the lateral positions of a perforation in a paper record interposed between said fingers and pick-up unit including parallel bus bars aligned with the rows of fingers and engageable by a finger extending through any perforation in said interposed paper record.

2. In a read-out head for interrogating a perforation spotted paper record, the combination comprising, a bank of resilient fingers mounted in aligned ranks and rows, means for mounting said fingers including bars carrying a rank of said fingers and extending transversely of the paper record, said bars each being pivotally mounted for movement between a retracted position wherein the fingers carried by a bar are spaced from paper record contact and an advanced position wherein the fingers carried by a bar are positioned in paper record contact, a pick-up unit for sensing a perforation in a paper record interposed between said fingers and pick-up unit, and solenoid means for each bar for selectively pivoting the latter between said advanced and retracted positions wherein combinations of ranks of fingers may be advanced into paper contact for interrogation of selected portions of the paper record.

3. In a read-out head for interrogating a perforation spotted paper record, the combination comprising, a bank of resilient fingers in aligned ranks and rows and mounted opposite the paper record, a pick-up unit for sensing the positions of perforations in a paper record interposed between said fingers and pick-up unit, means for mounting each rank of fingers for movement between a retracted position wherein the fingers are spaced from paper record contact and an advanced position wherein the fingers are positioned in paper contact, solenoid means for moving each rank of fingers between said advanced and retracted positons, the means for controlling said solenoid means and selecting combinations of ranks of fingers for advance into paper contact to interrogate selected portions of the paper record.

4. In a read-out head for interrogating a perforation spotted paper record, the combination comprising, a bank of resilient fingers in aligned ranks and rows and mounted opposite the paper record, a pick-up unit for sensing the positions of perforations in a paper record interposed between said fingers and pick-up unit, means for mounting each rank of fingers for movement between a retracted position wherein the fingers are spaced from paper record contact and an advanced position wherein the fingers are positioned in paper contact, means for moving each rank of fingers between said advanced and retracted positions, and means including a cascade circuit for controlling said last named means and selecting combinations of ranks of fingers for advance into paper contact to interrogate selected portions of the paper record, said circuit including a conductor corresponding to each rank of fingers which conductor when energized operates said last named means to simultaneously advance predetermined groups of ranks into paper contact.

References Cited by the Examiner

UNITED STATES PATENTS 3,042,299 7/1962 Sherman ---------- 235—61.11

MAYNARD R. WILBUR, *Primary Examiner.*

D. W. COOK, *Assistant Examiner.*